(12) United States Patent
Gallier et al.

(10) Patent No.: US 11,306,617 B2
(45) Date of Patent: Apr. 19, 2022

(54) SHROUD FOR A GAS TURBINE ENGINE

(71) Applicant: General Electric Company, Schenectady, NY (US)

(72) Inventors: Kirk Douglas Gallier, Liberty Township, OH (US); Charles William Craig, III, West Chester, OH (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 16/593,094

(22) Filed: Oct. 4, 2019

(65) Prior Publication Data

US 2020/0040769 A1 Feb. 6, 2020

Related U.S. Application Data

(63) Continuation of application No. 15/212,337, filed on Jul. 18, 2016, now Pat. No. 10,450,897.

(51) Int. Cl.
*F01D 25/24* (2006.01)
*F01D 9/04* (2006.01)
*F01D 11/00* (2006.01)

(52) U.S. Cl.
CPC ........... *F01D 25/246* (2013.01); *F01D 9/042* (2013.01); *F01D 11/005* (2013.01); *F05D 2300/6033* (2013.01); *Y02T 50/60* (2013.01)

(58) Field of Classification Search
CPC ... F01D 9/041; F01D 5/02; F01D 5/12; F01D 25/005; F01D 25/246; F01D 9/042; F01D 11/005; F05D 2220/32; F05D 2230/60; F05D 2240/10; F05D 2300/6033; Y02T 50/60

USPC ...................................................... 415/173.1
See application file for complete search history.

(56) References Cited

U.S. PATENT DOCUMENTS

| | | | | |
|---|---|---|---|---|
| 3,335,483 A | * | 8/1967 | Howald | F01D 9/042 29/889.22 |
| 5,411,370 A | * | 5/1995 | Varsik | F01D 25/04 415/209.4 |
| 5,494,404 A | * | 2/1996 | Furseth | F01D 9/042 415/209.3 |
| 5,630,700 A | * | 5/1997 | Olsen | F01D 9/042 415/134 |
| 5,797,725 A | * | 8/1998 | Rhodes | B23P 6/005 415/209.2 |

(Continued)

FOREIGN PATENT DOCUMENTS

EP 2466074 6/2012

*Primary Examiner* — Aaron R Eastman
(74) *Attorney, Agent, or Firm* — McGarry Bair PC

(57) ABSTRACT

Shrouds and shroud segments for gas turbine engines are provided. In one embodiment, a shroud segment for a gas turbine engine having a rotor blade stage and a nozzle stage is provided. The shroud segment comprises a forward end defining an outer wall of the rotor blade stage and an aft end defining an outer wall of the nozzle stage. The aft end defines at least a portion of an opening therethrough for receipt of a nozzle, and the forward end and the aft end form a single, continuous component. In another embodiment, a gas turbine engine is provided, having a shroud with a forward end positioned near a leading edge of a plurality of rotor blades of a rotor blade stage and an aft end positioned near a trailing edge of a plurality of nozzles of a nozzle stage. Methods of assembling a gas turbine engine also are provided.

20 Claims, 9 Drawing Sheets

(56) References Cited

U.S. PATENT DOCUMENTS

| | | | |
|---|---|---|---|
| 6,409,472 B1 * | 6/2002 | McMahon | F01D 25/246 |
| | | | 415/189 |
| 6,893,214 B2 | 5/2005 | Alford et al. | |
| 7,186,078 B2 | 3/2007 | Tanaka | |
| 7,329,087 B2 | 2/2008 | Cairo et al. | |
| 7,445,425 B2 | 11/2008 | Ferra et al. | |
| 8,240,980 B1 | 8/2012 | Liang | |
| 8,753,073 B2 | 6/2014 | Albers et al. | |
| 9,169,736 B2 * | 10/2015 | Hayford | F01D 9/042 |
| 9,255,487 B2 | 2/2016 | Mayer et al. | |
| 9,951,639 B2 * | 4/2018 | Ivakitch | F01D 11/005 |
| 2010/0166545 A1 * | 7/2010 | Schuler | F01D 25/06 |
| | | | 415/189 |
| 2011/0182726 A1 * | 7/2011 | McCaffrey | F01D 9/041 |
| | | | 415/208.2 |
| 2012/0009071 A1 * | 1/2012 | Tanahashi | F01D 5/282 |
| | | | 416/241 B |
| 2012/0102735 A1 * | 5/2012 | Moreland | F01D 9/041 |
| | | | 29/888.01 |
| 2014/0271144 A1 | 9/2014 | Landwehr et al. | |
| 2015/0204447 A1 | 7/2015 | Kloepfer | |
| 2017/0002674 A1 * | 1/2017 | Vetters | F01D 25/246 |
| 2017/0107837 A1 * | 4/2017 | Huizenga | F16J 15/061 |

* cited by examiner

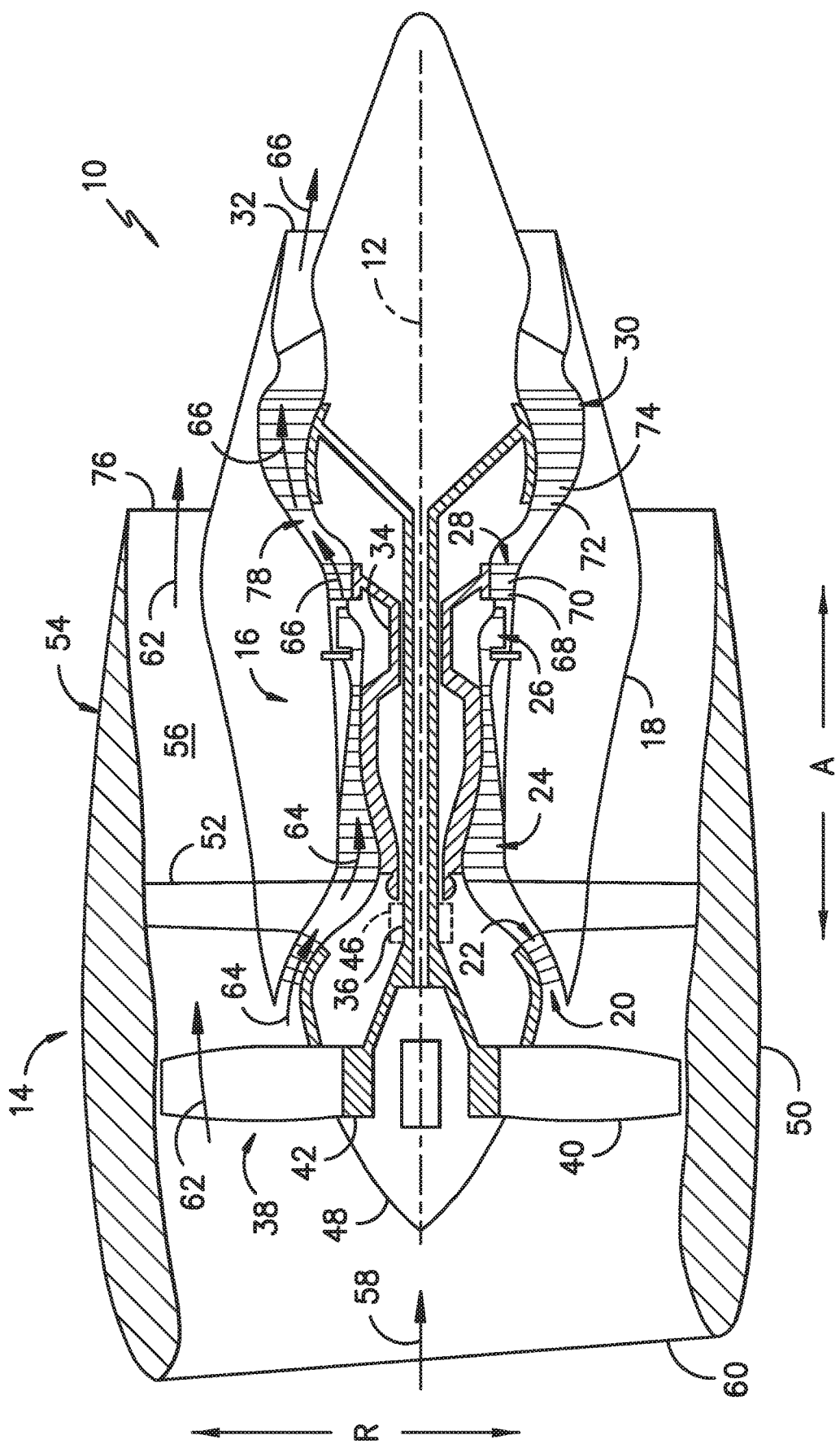
FIG. -1-

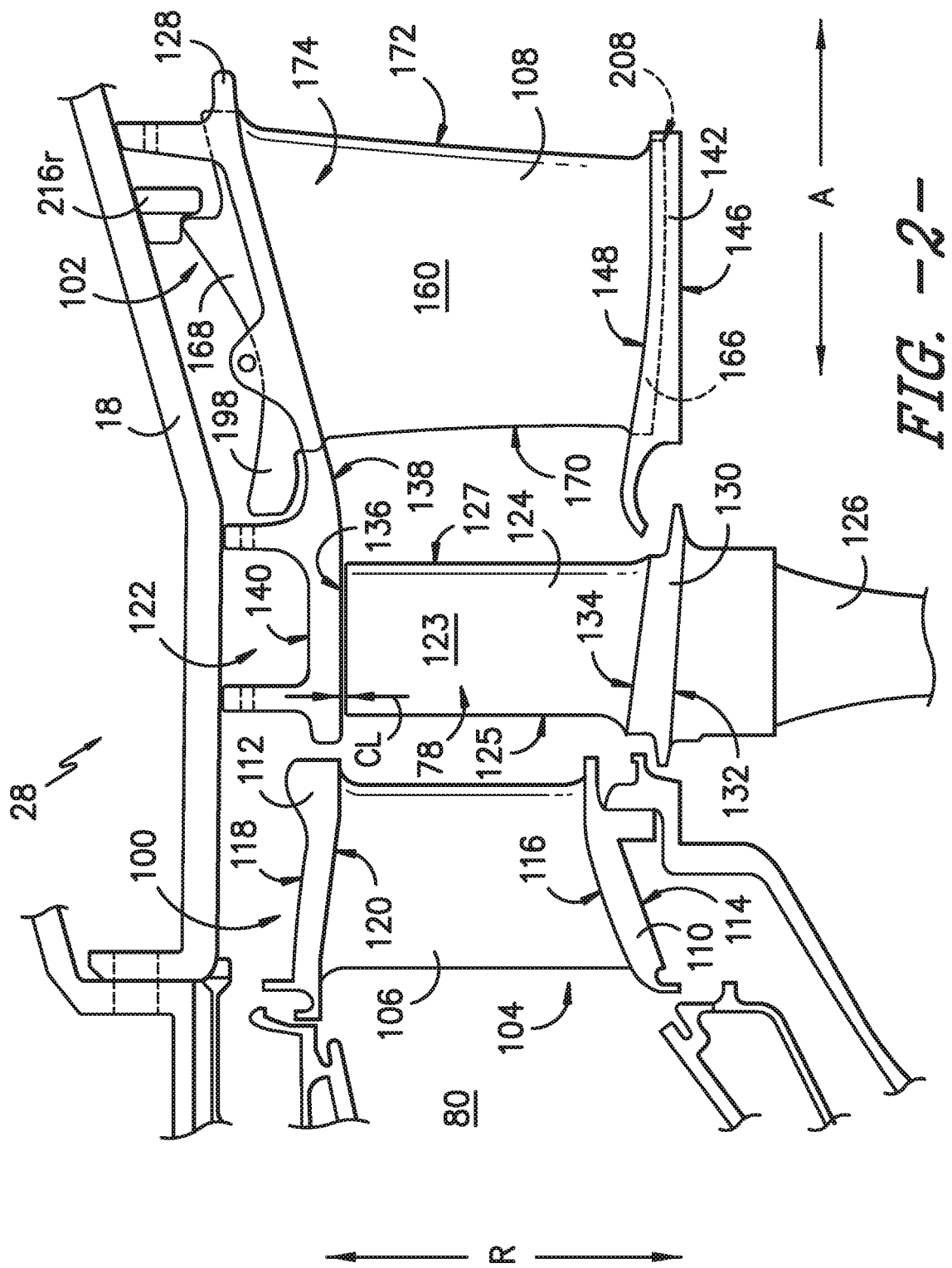

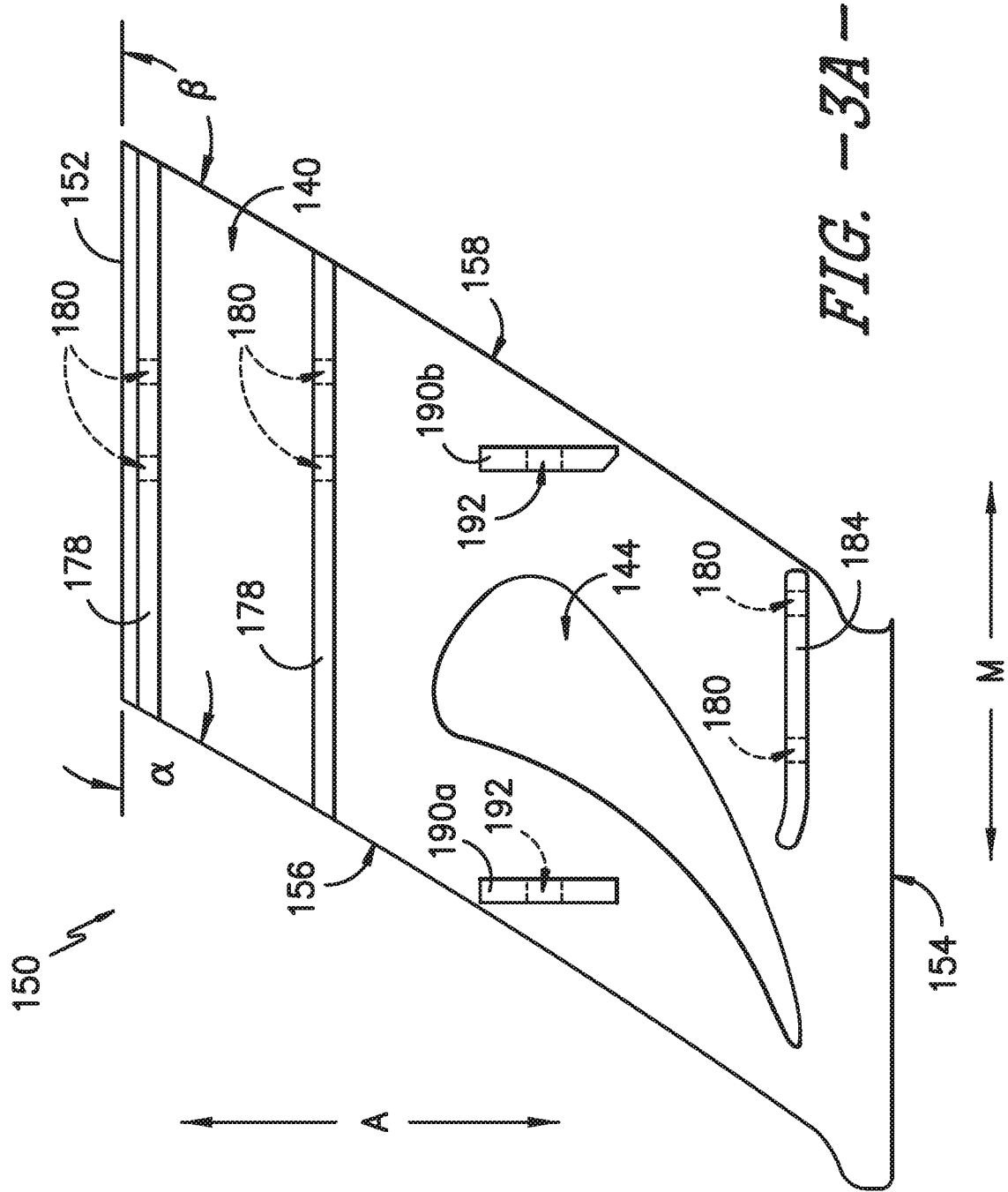

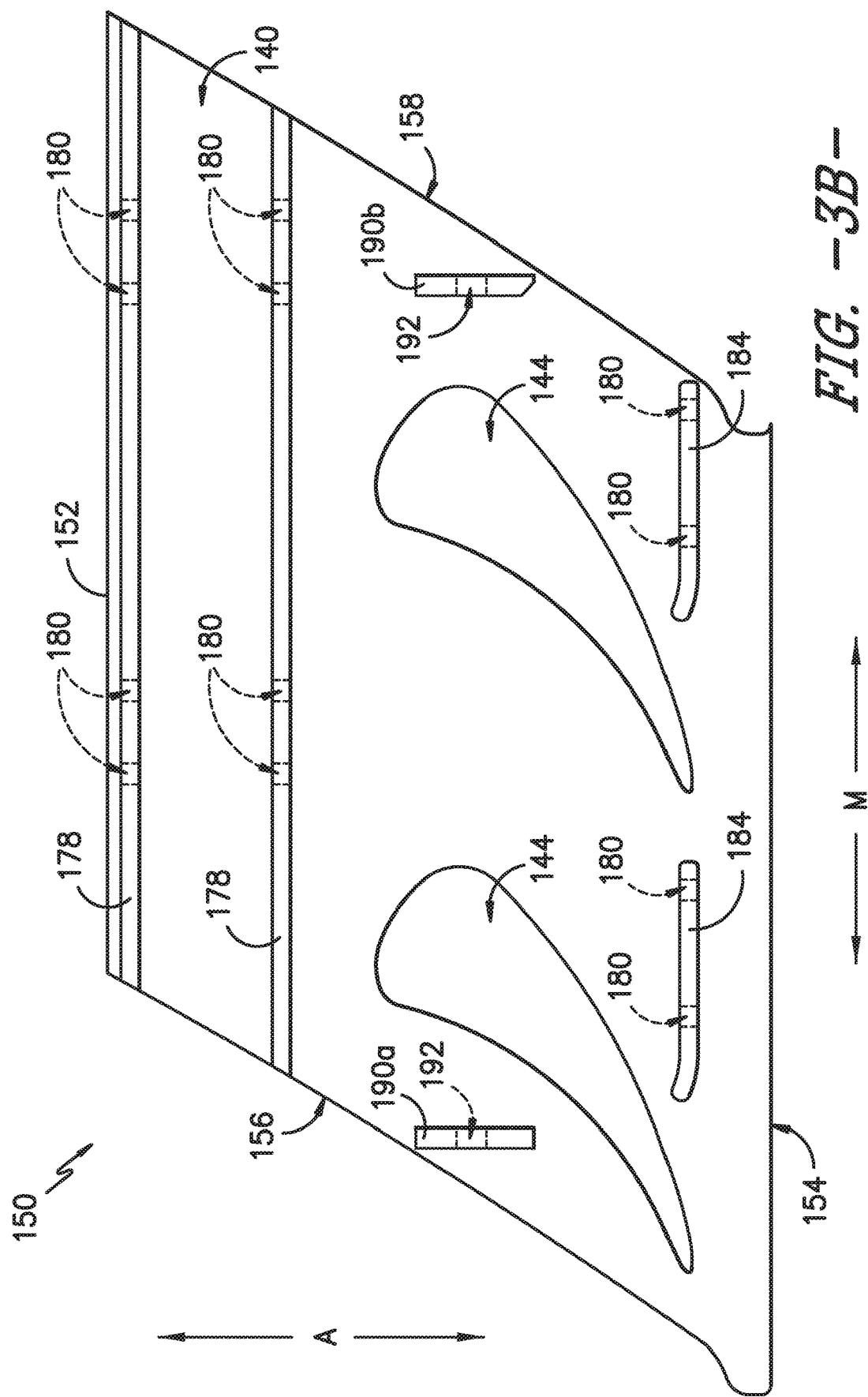

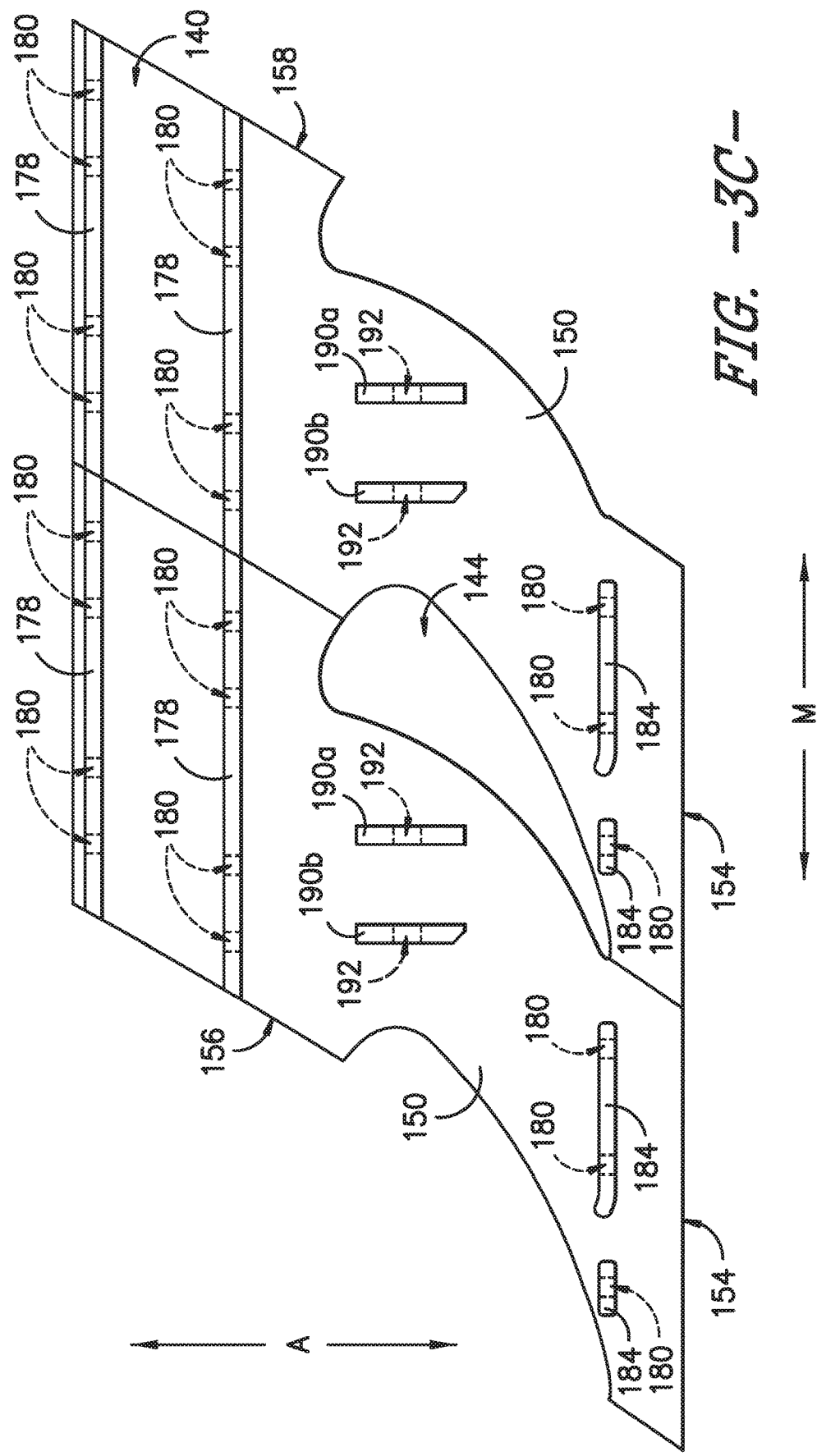

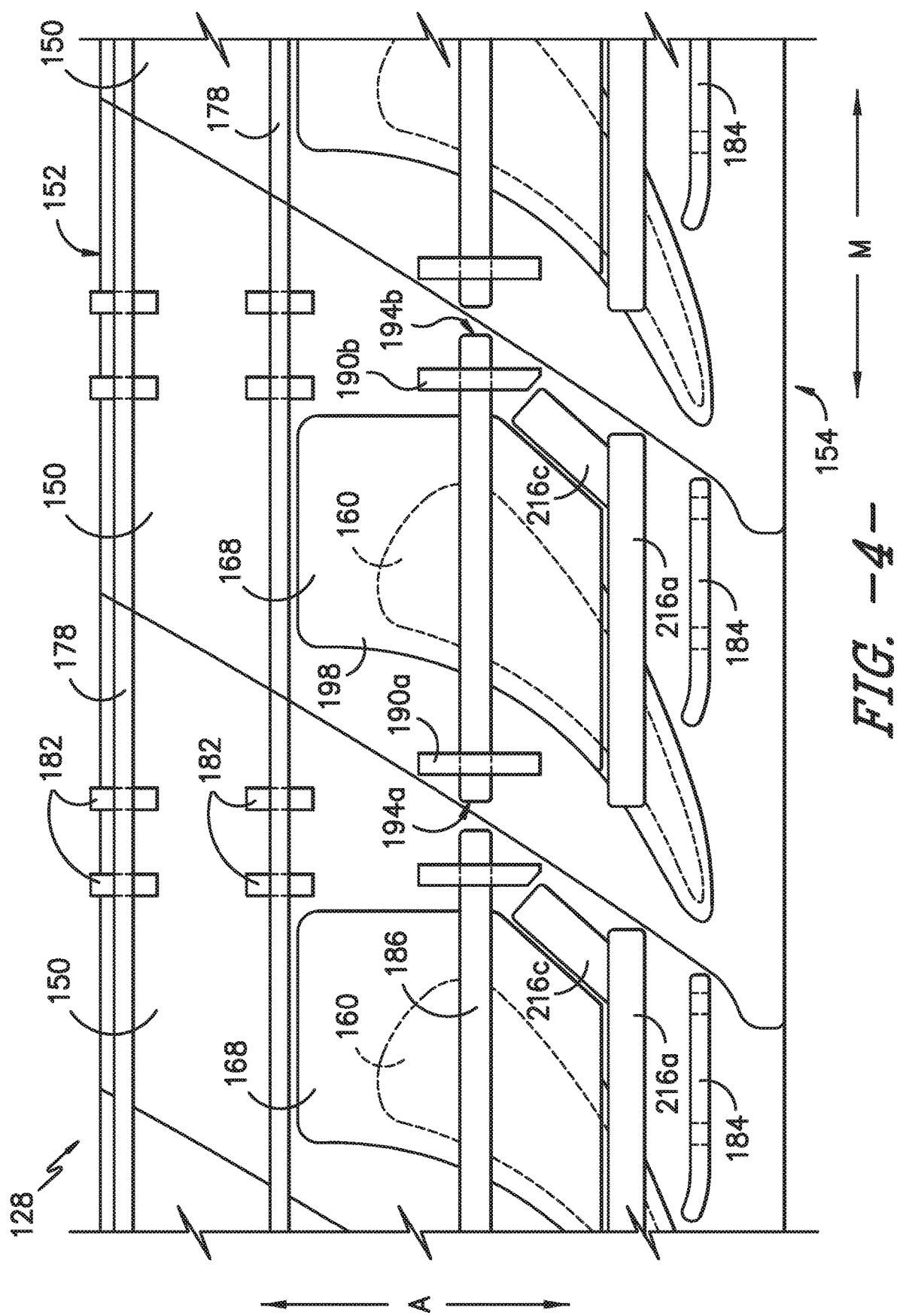
FIG. -4-

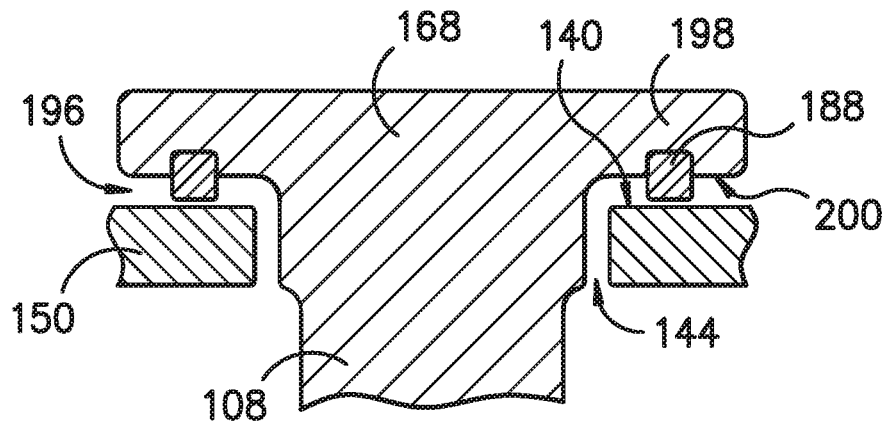
FIG. -5A-
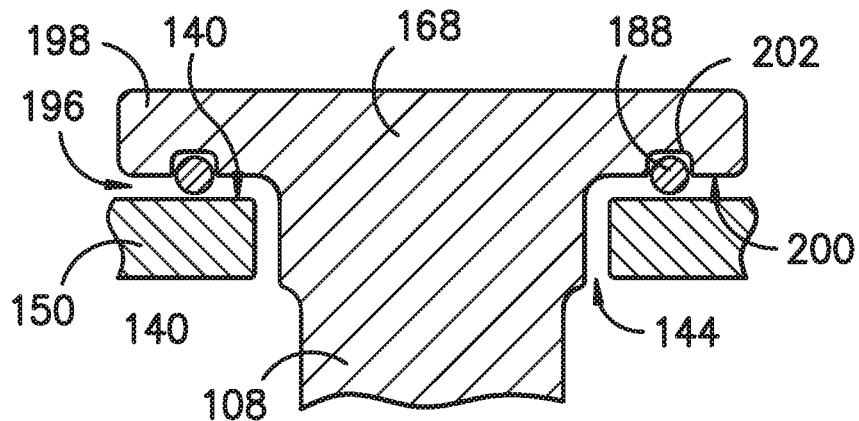
FIG. -5B-
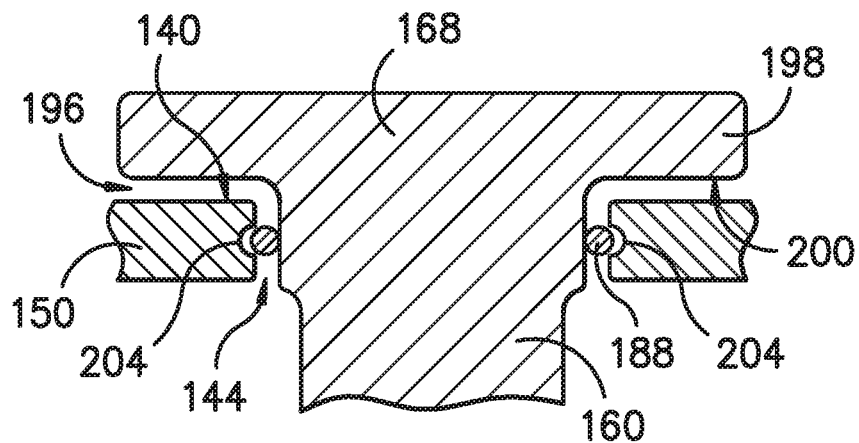
FIG. -5C-

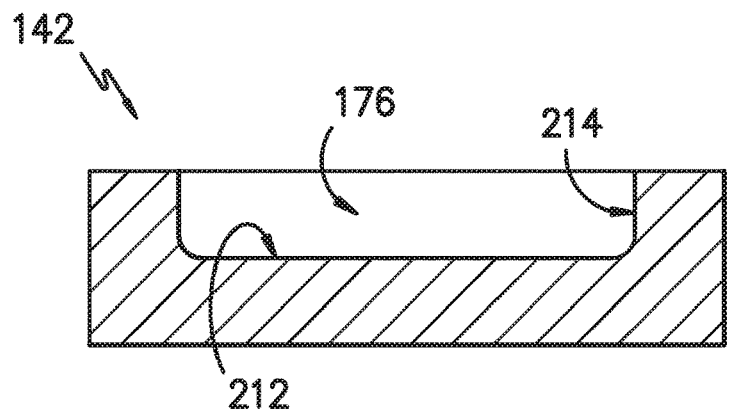
FIG. -6-
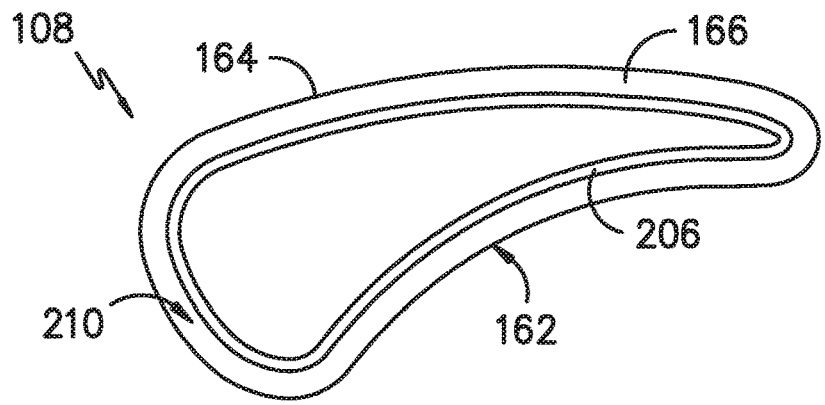
FIG. -7-
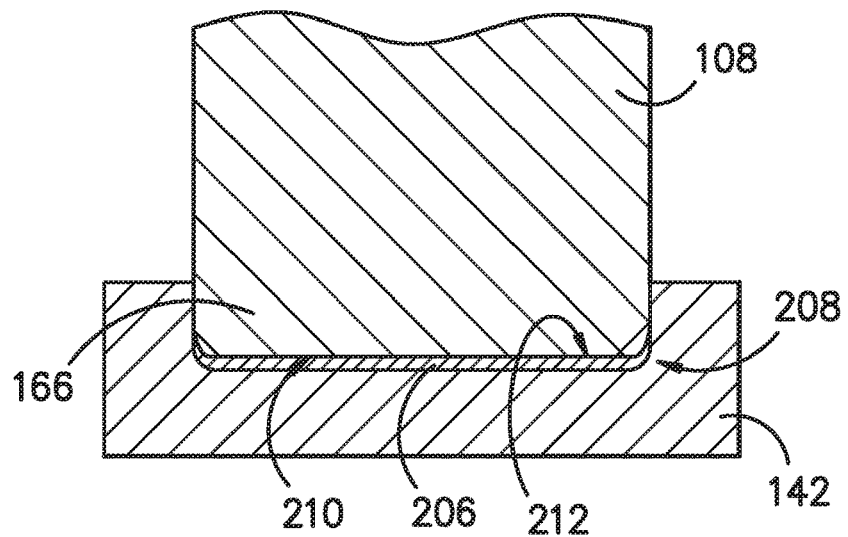
FIG. -8-

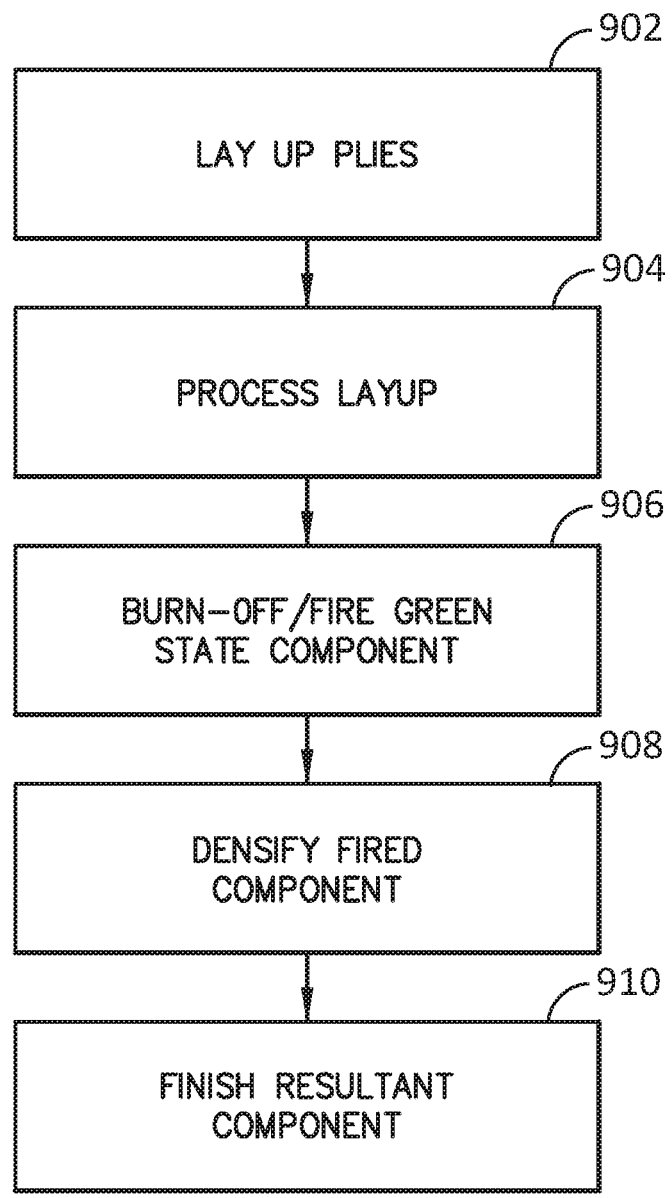
FIG. -9-

SHROUD FOR A GAS TURBINE ENGINE

CROSS-REFERENCE TO RELATED APPLICATIONS

This application is a continuation of and claims priority to U.S. application Ser. No. 15/212,337, filed Jul. 18, 2016, now U.S. Pat. No. 10,450,897, issued Oct. 22, 2019, the contents of which are incorporated herein by reference.

FIELD OF THE INVENTION

The present subject matter relates generally to gas turbine engines and particularly to features for eliminating leakage between a rotor blade stage and a stator vane stage of a gas turbine engine. More particularly, the present subject matter relates to an elongated shroud for a gas turbine engine.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

A typical stage of rotor blades, such as a turbine rotor blade stage, includes a shroud positioned radially outward from a platform of each blade, near the tips of the blades. Similarly, a typical stage of stator vanes or nozzles, such as a turbine nozzle stage, includes an outer band positioned radially outward from an inner band, at the radially outer end of each nozzle. Accordingly, at the axial interface between adjacent blade and nozzle stages, a gap exists between the shroud of the blade stage and the outer band of the nozzle stage. As such, fluid flowing within or around the stages, such as combustion gases flowing through the stages of the turbine section, may leak through the gap between the shroud and the outer band of the nozzle stage, which can impact engine performance. The axial shroud-outer band interface may pose other problems as well.

Therefore, an improved interface between a rotor blade stage and a nozzle stage of a gas turbine engine would be desirable. In particular, a shroud that extends over both a rotor blade stage and a nozzle stage, e.g., such that the shroud forms the outer band of the nozzle stage, would be advantageous. More particularly, a shroud over a rotor blade stage that extends axially aft through an adjacent nozzle stage with openings for nozzles of the nozzle stage would be beneficial. In addition, features for sealing the nozzles inserted through the openings in the shroud to seal the nozzle and the shroud would be desirable. Moreover, a shroud and/or nozzles formed from a ceramic matrix composite (CMC) material would be useful. Further, a method of assembling a gas turbine engine to include a shroud that forms an outer wall of both a rotor blade stage and a nozzle stage would be desirable.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a shroud segment for a gas turbine engine is provided. The gas turbine engine includes a rotor blade stage and a nozzle stage. The shroud segment comprises a forward end and an aft end. The forward end defines an outer wall of the rotor blade stage, and the aft end defines an outer wall of the nozzle stage. The aft end also defines at least a portion of an opening therethrough for receipt of a nozzle. The forward end and the aft end form a single, continuous component.

In another exemplary embodiment of the present disclosure, a gas turbine engine is provided. The gas turbine engine comprises a rotor blade stage that includes a plurality of circumferentially spaced rotor blades, each rotor blade having a tip. The gas turbine engine also comprises a nozzle stage adjacent the rotor blade stage that includes a plurality of circumferentially spaced nozzles, each nozzle extending radially outward from an inner band. Further, the gas turbine engine includes a shroud having a forward end positioned radially outward from the tips of the rotor blades, and an aft end positioned radially outward from the inner band of the nozzle stage. The shroud extends axially from the forward end to the aft end. The forward end is positioned near a leading edge of each of the plurality of rotor blades and the aft end is positioned near a trailing edge of each nozzle of the plurality of nozzles.

In a further exemplary embodiment of the present disclosure, a method of assembling a gas turbine engine is provided. The gas turbine engine includes a rotor blade stage and a nozzle stage. The method comprises positioning a shroud to form an outer wall of both the rotor blade stage and the nozzle stage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter.

FIG. 2 provides a close-up, side view of a portion of a turbine section of the exemplary gas turbine engine of FIG. 1.

FIG. 3A provides a top view of a shroud segment according to an exemplary embodiment of the present subject matter.

FIG. 3B provides a top view of a shroud segment according to another exemplary embodiment of the present subject matter.

FIG. 3C provides a top view of a shroud segment according to another exemplary embodiment of the present subject matter.

FIG. 4 provides a top view of a portion of an exemplary shroud formed from a plurality of shroud segments as in FIG. 3 and assembled with nozzles of the exemplary gas turbine engine of FIG. 1.

FIG. 5A provides a schematic cross-section view of an outer nozzle end of a nozzle assembled with the exemplary shroud segment of FIG. 3 according to an exemplary embodiment of the present subject matter.

FIG. 5B provides a schematic cross-section view of an outer nozzle end of a nozzle assembled with the exemplary shroud segment of FIG. 3 according to another exemplary embodiment of the present subject matter.

FIG. 5C provides a schematic cross-section view of an outer nozzle end of a nozzle assembled with the exemplary shroud segment of FIG. 3 according to another exemplary embodiment of the present subject matter.

FIG. 6 provides a schematic cross-section view of an inner band segment of the turbine section of FIG. 2 according to an exemplary embodiment of the present subject matter.

FIG. 7 provides a bottom view of an inner nozzle end and seal according to an exemplary embodiment of the present subject matter.

FIG. 8 provides a schematic cross-section view of an inner nozzle end assembled with the exemplary inner band segment of FIG. 6 according to an exemplary embodiment of the present subject matter.

FIG. 9 provides a chart illustrating a method for forming a shroud segment from a ceramic matrix composite (CMC) material according to an exemplary embodiment of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine exhaust nozzle, or a component being relatively closer to the engine exhaust nozzle as compared to another component. The terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

In general, the present subject matter is directed to shroud and nozzle assemblies and features for eliminating an axial interface gap between a shroud and a nozzle. More particularly, in some embodiments, a shroud is formed from a plurality of shroud segments, and each shroud segment comprises a forward end and an aft end. The aft end defines at least a portion of an opening therethrough for receipt of a nozzle, and the forward end and the aft end form a single, continuous component. The forward end is positioned radially outward from tips of a plurality of rotor blades of a rotor blade stage of a gas turbine engine, and the aft end is positioned radially outward from a plurality of inner band segments forming an inner band of a nozzle stage of the gas turbine engine. As such, in an exemplary embodiment, the shroud extends over both a rotor blade stage and a stator vane stage of a gas turbine engine, which eliminates gaps between a radially outer wall of the rotor blade stage and a radially outer wall of the stator vane stage because the radially outer wall of the rotor blade stage and the stator vane stage is a single, unitary component, namely, the shroud.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal axis or centerline 12 provided for reference) and a radial direction R. In general, the turbofan 10 includes a fan section 14 and a core turbine or gas turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. Fan blades 40 and disk 42 are together rotatable about the longitudinal axis 12 by LP shaft 36. In some embodiments, the fan blades 40 and disk 42 are rotatable across a power gear box 46 that includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Referring now to FIG. 2, a schematic view is provided of the HP turbine 28 of the turbine section of core turbine engine 16, which is located downstream from combustion section 26. The combustion section 26 generally includes a combustor defining a combustion chamber 80; a mixture of fuel and air is combusted within the combustion chamber to generate a flow of combustion gases therethrough. Downstream of the combustion section 26, the HP turbine 28 includes a plurality of turbine component stages. Each turbine component stage comprises a plurality of turbine components that define and/or are positioned within the hot gas path 78 through which the combustion gases flow.

More particularly, for the embodiment depicted in FIG. 2, HP turbine 28 includes a plurality of turbine nozzle stages, as well as one or more stages of turbine rotor blades. Specifically, the HP turbine 28 includes a first turbine nozzle stage 100 and a second turbine nozzle stage 102, each configured to direct a flow of combustion gasses therethrough. Notably, the first turbine nozzle stage 100 is located immediately downstream from the combustion section 26, and thus may also be referred to as a combustor discharge nozzle stage having a plurality of combustion discharge nozzle sections.

The first turbine nozzle stage 100 includes a plurality of turbine nozzle sections 104 spaced along the circumferential direction M (FIG. 3). Each first turbine nozzle section 104 forming the first turbine nozzle stage 100 includes a first stage turbine nozzle 106 positioned within the hot gas path 78. Further, each nozzle section 104 includes an inner band segment 110 defining an inner wall of the nozzle section 104 and an outer band segment 112 defining an outer wall of the nozzle section 104, with nozzle 106 extending generally along the radial direction R from inner band segment 110 to outer band segment 112. Inner band segment 110 of the first nozzle section 104 defines a cold side 114 and an opposite hot side 116; hot side 116 is exposed to and at least partially defining the hot gas path 78. Similarly, outer band segment 112 of the first nozzle section 104 defines a cold side 118 and an opposite hot side 120; hot side 120 is exposed to and at least partially defining the hot gas path 78. Together, the plurality of first turbine nozzle sections 104 define the first turbine nozzle stage 100, with an inner band defined by the plurality of inner band segments 110 of nozzle sections 104, an outer band defined by the plurality of outer band segments 112 of nozzle sections 104, and a plurality of nozzles 106 extending from the inner band to the outer band.

Located immediately downstream of the first turbine nozzle stage 100 and immediately upstream of the second turbine nozzle stage 102, the HP turbine 28 includes a first stage 122 of turbine rotor blades 124. First stage 122 of turbine rotor blades 124 includes a plurality of turbine rotor blades 124 spaced along the circumferential direction M (FIG. 3) and a first stage rotor 126. Each turbine rotor blade 124 has an airfoil 123 extending axially between a leading edge 125 and a trailing edge 127. Further, each rotor blade 124 is attached to the first stage rotor 126. Although not depicted, the first stage turbine rotor 126 is, in turn, connected to the HP shaft 34 (FIG. 1). In such manner, the turbine rotor blades 124 may extract kinetic energy from the flow of combustion gases through the hot gas path 78 defined by the HP turbine 28 as rotational energy applied to the HP shaft 34. Core gas turbine engine 16 additionally includes a shroud 128 exposed to and at least partially defining hot gas path 78. Shroud 128 is described in greater detail below.

Similar to the plurality of nozzle sections 104 forming the first turbine nozzle stages 100, a radially inner portion of each turbine rotor blade 124 includes a wall or platform 130. The platform 130 of each turbine rotor blade 124 defines a cold side 132, as well as an opposite hot side 134 exposed to and at least in part defining the hot gas path 78. Additionally, each turbine rotor blade 124 includes a tip 136 at a radially outer portion of the blade. Shroud 128 may radially be spaced apart from the blade tips 136 such that a radial or clearance gap CL is defined between tips 136 and shroud 128. That is, shroud 128 is positioned radially adjacent blades 124 to define an outer wall of the rotor blade stage 122. Shroud 128 includes a radially inner surface 138 opposite a radially outer surface 140. Outer surface 140 is a cold side surface of shroud 128, and inner surface 138, which is exposed to and at least in part defines the hot gas path 78, is a hot side surface of shroud 128. Accordingly, the clearance gap CL is defined between blade tips 136 and the hot side surface 138 of shroud 128. As shown in FIG. 2, shroud 128 is tightly configured relative to the blades 124 so that the shroud 128 defines an outer radial flow path boundary for the hot combustion gas flowing through the turbine 16. It is generally desirable to minimize the clearance gap CL between the blade tips 136 and the turbine shroud 128, particularly during cruise operation of the turbofan 10, to reduce leakage from the hot gas path 78 over the blade tips 136 and through the clearance gap CL.

As depicted in FIG. 2, shroud 128 extends axially aft through second turbine nozzle stage 102. As such, shroud 128 extends within the first rotor blade stage 122 and the second turbine nozzle stage 102. Similar to the first turbine nozzle stage 100, the second turbine nozzle stage 102 includes a plurality of second stage turbine nozzles 108 positioned within the hot gas path 78. More particularly, second turbine nozzle stage 102 includes a plurality of inner band segments 142 forming an inner wall of second turbine nozzle stage 102, and shroud 128 is positioned to form an outer wall of second turbine nozzle stage 102. Each second stage turbine nozzle 108 extends generally along the radial direction R from an inner band segment 142 through an opening 144 (FIG. 3) in the shroud 128. Each inner band segment 142 of the second turbine nozzle stage 102 defines a cold side 146 and an opposite hot side 148, which is exposed to and at least partially defines the hot gas path 78. Moreover, the plurality of inner band segments 142 together defines an inner band of second turbine nozzle stage 102. Further, radially outward from inner band segment 142, inner surface 138 of shroud 128 defines a hot side of second turbine nozzle stage 102 and outer surface 140 of shroud 128 defines a cold side. As discussed above, the inner surface 138 of shroud 128 is exposed to and at least partially defines the hot gas path 78. Accordingly, inner surface 138 of shroud 128 at least partially defines the hot gas path 78 through first turbine blade stage 122 and second turbine nozzle stage 102.

Each nozzle 108 includes an airfoil 160 having a concave pressure side 162 opposite a convex suction side 164 (FIG. 7). As such, pressure and suction sides 162, 164 of each airfoil 160 generally define an airfoil shape. Opposite pressure and suction sides 162, 164 of each airfoil 160 extend radially along a span from a radially inner nozzle end 166 to a radially outer nozzle end 168. Moreover, pressure and suction sides 162, 164 of airfoil 160 extend axially between a leading edge 170 and an opposite trailing edge 172, and pressure and suction sides 162, 164 define an outer surface 174 of airfoil 160.

Shroud 128 generally forms a ring or shroud around a stage of turbine rotor blades and a stage of turbine nozzles adjacent the stage of turbine rotor blades, i.e., each shroud 128 extends circumferentially about the longitudinal engine axis 12 proximate a turbine rotor blade stage and a turbine nozzle stage. In the depicted exemplary embodiment, shroud 128 is an annular shroud that extends circumferentially around first stage 122 of turbine rotor blades 124 and second turbine nozzle stage 102; that is, shroud 128 extends about first turbine rotor blade stage 122 and second turbine nozzle stage 102, which is immediately downstream, i.e., axially aft, of first stage 122 of turbine rotor blades 124.

In some embodiments, shroud 128 may be formed as a continuous, unitary, or seamless ring. However, as shown in FIGS. 3 and 4, in other embodiments shroud 128 may be formed from a plurality of shroud segments 150. Each shroud segment 150 includes a forward end 152 and an aft end 154. Further, each shroud segment 150 is a single, continuous component that extends axially from its forward end 152 to its aft end 154. Thus, in exemplary embodiments such as the embodiment shown in FIG. 2, shroud 128 may include a plurality of shroud segments 150 positioned next to one another along the circumferential direction to form generally annular shroud 128 around first turbine rotor blade stage 122 and second turbine nozzle stage 102.

Further, although described herein with respect to HP turbine 28, it should be noted that shroud 128 may additionally be utilized in a similar manner in the low pressure compressor 22, high pressure compressor 24, and/or LP turbine 30. Accordingly, shrouds as disclosed herein are not limited to use in HP turbines but rather may be utilized in any suitable section of a turbofan 10, e.g., in any suitable section of core turbine engine 16 of turbofan 10.

Referring to FIG. 2, the forward end 152 of each shroud segment 150 is positioned radially outward from the tips 136 of rotor blades 124, as well as the platforms 130 of blades 124. Moreover, the forward end 152 of each shroud segment 150 is positioned axially near the leading edges 125 of rotor blades 124. As such, the forward end 152 of each shroud segment 150 is positioned to define an outer wall segment of rotor blade stage 122, and the clearance gap CL is defined between each of the plurality of blades 124 and inner surface 138 of shroud segment 150. The aft end 154 is positioned radially outward from the inner band segments 142 of second turbine nozzle stage 102 and axially near the trailing edges 172 of nozzles 108. Accordingly, the aft end 154 of each shroud segment 150 is positioned to define an outer wall segment of nozzle stage 102. It will be understood that each shroud segment 150 includes a radially inner surface 138 and a radially outer surface 140 as described above with respect to shroud 128.

Moreover, as shown in FIG. 3A, each shroud segment 150 defines a first side 156 and a second side 158. Each of the first side 156 and second side 158 extend axially from the forward end 152 to the aft end 154. Additionally, in the illustrated embodiment, each of the first side 156 and the second side 158 extend at a non-orthogonal angle with respect to the forward end 152 and the aft end 154 of the respective shroud segment 150. That is, first and second sides 156, 158 are angled with respect to forward and aft ends 152, 154 of shroud segment 150. More particularly, the first side 156 extends at a first non-orthogonal angle α with respect to forward end 152 or aft end 154, and the second side 158 extends at a second non-orthogonal angle β with respect to forward end 152 or aft end 154. As illustrated in FIG. 3, first side 156 extends at first non-orthogonal angle α with respect to forward end 152, and the second side 158 extends at second non-orthogonal angle β with respect to forward end 152. Angles α and β generally may be complementary to one another such that the first side 156 of one shroud segment 150 may be positioned adjacent the second side 158 of another shroud segment to form shroud 128, as shown in FIG. 4. Of course, in other embodiments, first and second sides 156, 158 may not be angled with respect to forward and aft ends 152, 154.

A turbine stator, such as second turbine nozzle stage 102, may be formed by a plurality of segments that are abutted at circumferential sides to form a complete ring about engine centerline 12. In the depicted embodiment of FIG. 2, the turbine stator 102 is formed from a plurality of shroud segments 150 abutted at their circumferential first and second sides 156, 158 and a plurality of inner band segments 142 abutted at their circumferential sides, with second stage nozzles 108 extending from the inner band segments 142 through openings 144 in shroud segments 150. As such, inner band segments 142 form an inner band of the second turbine nozzle stage 102 and the shroud segments 150 form an outer band of the second turbine nozzle stage 102. As described above, the inner band defines an inner wall of the nozzle stage 102 and the outer band defines an outer wall of the nozzle stage 102. It will be understood that, in this exemplary embodiment, because shroud 128 (formed by shroud segments 150) extends axially from the first turbine rotor stage 122 through the second turbine nozzle stage 102, and more particularly, from a forward end generally near the leading edges of the blades of the turbine rotor stage to an aft end generally near the trailing edges of the nozzles of the turbine nozzle stage, the outer band of second turbine nozzle stage 102 is integral with the shroud of the first turbine rotor stage 122.

As previously stated, each nozzle 108 of second turbine nozzle stage 102 extends from an inner band segment 142 and through a corresponding opening 144 in shroud 128. More particularly, as shown in FIGS. 3A through 3C, the aft end 154 of each shroud segment 150 defines at least a portion of an opening 144 therethrough for receipt of a second stage nozzle 108. As such, each opening 144 generally may be airfoil-shaped, i.e., each opening 144 generally may correspond to the shape of the airfoil portion 160 of second stage turbine nozzle 108 such that each opening 144 has a shape complementary to the airfoil shape. In some embodiments, such as the embodiment of FIG. 3A, each shroud segment 150 may define one opening 144, but in other embodiments, shroud segments 150 may define more than one opening 144, such as two openings 144 as shown in FIG. 3B, or three or more openings 144. In still other embodiments, such as the embodiment depicted in FIG. 3C, a first shroud segment 150 may define a portion of an opening 144, and a second, adjacent shroud segment 150 may define the remainder of the opening 144 such that when the first and second shroud segments are abutted against one another, the first and second shroud segments together define the opening 144. Of course, shroud 128 may comprise any combination of shroud segment 150 configurations, i.e., not all shroud segments 150 need define the same number of openings 144.

Further, as depicted in FIGS. 2 and 4, when a nozzle 108 is received within an opening 144, the outer nozzle end 168 of the nozzle 108 extends radially outward beyond the outer surface 140 of the shroud segment 150. Moreover, the radially inner nozzle end 166 of a nozzle 108 is received within a depression or cavity 176 (FIG. 6) in an inner band segment 142. Thus, nozzles 108 of second turbine nozzle stage 102 extend radially from inner band segments 142 through the openings 144 defined in the aft ends 154 of the plurality of shroud segments 150.

As illustrated in FIGS. 2 through 4, each shroud segment 150 may include a plurality of features for mounting the shroud 128 within HP turbine section 28 of core turbine engine 16, as well as a plurality of features for retaining nozzle 108 within opening 144 in the shroud segment 150. Additionally or alternatively, features also may be provided for maintaining the relative positions of nozzle 108 and shroud segment 150 within the turbine assembly. For example, shroud segment 150 includes rails 178, which also may be referred to as hanger pin mounts or simply hangers, for coupling the shroud segment 150 to, e.g., outer casing 18 of core turbine engine 16 as shown in FIG. 2 (any reciprocal mounting hardware of casing 18 is omitted for clarity). In the embodiment shown in FIGS. 2 through 4, each rail 178 extends outward along the radial direction R from the radially outer surface 140 of shroud segment 150 and also extends circumferentially along the circumferential direction M. Each rail 178 defines one or more apertures 180, each aperture 180 configured for receipt of a mounting pin 182 to couple the shroud segment 150 to a corresponding mount or other appropriate portion of, e.g., casing 18. Of course, other types or forms of fasteners may be used to attach shroud segments 150 to an appropriate component of engine 16.

Rails 178 extend from the forward end 152 of shroud segment 150. The exemplary shroud segment 150 also includes a pin mount 184 extending along the radial direction R from the outer surface 140 of shroud segment 150 at the aft end 154 of the shroud segment 150. Similar to rails 178, pin mount 184 also may extend along the circumferential direction M and may define one or more apertures 180, each aperture 180 configured for receipt of a mounting pin 182 to couple the shroud segment 150 to a corresponding mount or other appropriate portion of, e.g., casing 18. As previously discussed, a fastener other than mounting pins 182 also may be used to mount shroud segments 150 within engine 16. Further, as shown in FIGS. 2, 3, and 4, each shroud segment 150 includes a pair of rails 178, spaced apart from one another along the axial direction A, and a pin mount 184 for attaching shroud segments 150, and thereby shroud 128, to the casing 18 or other component of the turbofan 10. Nevertheless, shroud segments 150 may include any suitable projection(s) or other feature(s) for mounting shroud 128 within the assembly forming HP turbine section 28.

As further illustrated in FIG. 4, shroud segments 150 optionally may include a radial retainer 186, which, e.g., may help engage or seat a seal 188 (FIGS. 5A-5C) between nozzle 108 and shroud segment 150. The seal 188, which may be referred to as nozzle-shroud seal 188, is described in greater detail below. Retainer 186 extends generally circumferentially along the circumferential direction M between a first retainer mount 190a adjacent first side 156 of shroud segment 150 and a second retainer mount 190b defined adjacent second side 158 of shroud segment 150. Similar to rails 178 and pin mount 184, first and second retainer mounts 190a, 190b extend along the radial direction R from the outer surface 140 of shroud segment 150. Moreover, each retainer mount 190a, 190b define an aperture 192 for receipt of an end 194 of retainer 186. More particularly, first retainer mount 190a defines an aperture 192 for receipt of a first end 194a of retainer 186, and second retainer mount 190b defines an aperture 192 for receipt of a second end 194b of retainer 186. The radial retainer 186, e.g., may assist in holding nozzle 108 in place during assembly of the HP turbine section 28 or, as mentioned above, may help engage the seal 188 between nozzle 108 and shroud segment 150.

Turning to FIGS. 5A through 5C, various configurations of nozzle-shroud seals 188 are illustrated. Seals 188 help reduce leakage of combustion gases 66 from the hot gas path 78 between nozzles 108 and shroud 128 (formed by shroud segments 150). In exemplary embodiments, turbine 16 includes a plurality of nozzle-shroud seals 188 such that a seal 188 extends along an entire interface 196 between a nozzle 108 and a shroud segment 150, i.e., a seal 188 is provided for each nozzle-shroud interface 196. More specifically, each opening 144 defines a perimeter, which may be generally airfoil-shaped as described above, and nozzle 108 interfaces with a shroud segment 150, or adjacent first and second shroud segments 150 when opening 144 is partially defined by each of the first and second shroud segments 150, along the perimeter. Thus, nozzle-shroud seal 188 is positioned to provide a seal along the interface 196 between nozzle 108 and shroud segment(s) 150. For example, outer nozzle end 168 may define a flange 198 extending about outer nozzle end 168 (FIGS. 2 and 4), and flange 198 may have a contact surface 200 extending adjacent outer surface 140 of shroud segment 150. In one embodiment, as shown in FIG. 5A, nozzle-shroud seal 188 is positioned between outer surface 140 of shroud segment 150 and contact surface 200 of flange 198 of nozzle 108. In another embodiment, illustrated in FIG. 5B, outer nozzle end 168 may define a pocket 202 adjacent contact surface 200, and nozzle-shroud seal 188 may be positioned within pocket 202 to provide a seal between flange 198 of nozzle 108 and outer surface 140 of shroud segment 150. In yet another embodiment, depicted in FIG. 5C, shroud segment 150 may define a pocket 204 adjacent opening 144, and nozzle-shroud seal 188 may be positioned within pocket 204 to provide a seal between airfoil portion 160 of nozzle 108 and shroud segment 150. Of course, nozzle-shroud seal 188 may be positioned in other locations as well to help reduce the amount of combustion gases 66 that escape from hot gas path 78 through the interface 196 between nozzle 108 and shroud segment 150.

As further shown in FIGS. 5A through 5C, nozzle-shroud seal 188 may have any appropriate cross-section and size and may be any appropriate type of seal for reducing the loss of combustion gases 66 through the nozzle-shroud interface 196. For example, seal 188 may have a generally rectangular cross-section as shown in FIG. 5A or a generally circular cross-section as shown in FIGS. 5B and 5C. Further, in various embodiments, each nozzle-shroud seal 188 may be a ring seal, wire seal, C-seal, rope seal, piston seal, or any other suitable type of seal. Additionally, any combination of suitable seals may be used for the plurality of seals 188, i.e., each seal 188 need not be the same type or size of seal or have the same cross-sectional shape.

Turning now to FIGS. 6-8, a seal 206 also may be included between nozzle 108 and inner band segment 142; as such, seal 206 may be referred to as nozzle-band seal 206. Seal 206 helps reduce leakage between nozzles 108 and the inner band of second turbine nozzle stage 102, which is formed by inner band segments 142. In exemplary embodiments, turbine 16 includes a plurality of nozzle-band seals 206 such that a seal 206 extends along an entire interface 208 between a nozzle 108 and an inner band segment 142, i.e., a seal 206 is provided for each nozzle-band interface 208. More specifically, depression 176 defined in each inner band segment 142 generally defines an airfoil shape that corresponds with the shape of inner nozzle end 166, and the inner end 166 of a nozzle 108 interfaces with a respective inner band segment 142 when the nozzle 108 is received within the depression. Thus, nozzle-band seal 206 is positioned to provide a seal along the interface 208 between nozzle 108 and inner band segment 142. For example, as illustrated in FIG. 8, nozzle-band seal 206 may be positioned between the radially innermost surface 210 of inner nozzle end 166 and a radially innermost surface 212 of inner band segment 142 defining depression 176. In other embodiments, nozzle-band seal 206 may be positioned between pressure and suction sides 162, 164 of airfoil 160 at inner nozzle end 166 and a side surface 214 of inner band segment defining depression 176. Alternatively, nozzle-band seal 206 may be positioned in any appropriate location, and any suitable size, shape, type, and/or number of nozzle-band seal 206 may be used.

In some embodiments, nozzle-shroud seals 188 and/or nozzle-band seals 206 may be constructed from a suitable metallic material, such as a nickel or cobalt alloy. Suitable nickel and cobalt alloys include RENE 41® Alloy produced by General Electric Co. of Schenectady, N.Y., USA; HAYNES® alloy 188 produced by Haynes International of Kokomo, Ind., USA; and UDIMET® alloy L-605 produced by Special Metal Corporation of New Hartford, N.Y., USA. However, any suitable metallic material may be used for seals 188 and/or seals 206.

Referring back to FIGS. 2 and 4, one or more radial, axial, and/or circumferential stops also may be used with shroud segments 150 and nozzles 108. For example, an axial stop 216a may be positioned against outer nozzle end 168 toward the trailing edge 172 of nozzle 108, and a circumferential stop 216c may be positioned against outer nozzle end 168 toward suction side 164 of nozzle 108. Stops 216a, 216c may, e.g., help load nozzle 108 into case 18. Stops 216a, 216c also may help maintain the relative axial positions of nozzle 108 and shroud segment 150 and, in at least some embodiments, may provide some sealing against the loss of combustion gases 66 from hot gas path 78.

Although the shroud 128 is described above as forming an outer wall of both the first turbine rotor blade stage 122 and the second turbine nozzle stage 102, in other embodiments, the shroud 128 may be used to form an outer wall of other stages of the turbine section or may be used in the compressor section of turbofan engine 10. For example, the shroud 128 may be configured to form an outer wall of the first turbine nozzle stage 100 and first turbine rotor blade stage 122. In such embodiments, the shroud may extend axially from a forward end positioned generally near leading edges of nozzles 106 of the first turbine nozzle stage 100 to an aft end positioned generally near trailing edges 127 of blades 124 of the first turbine rotor blade stage 122. As another example, the shroud 128 may be configured to form an outer wall of the second turbine nozzle stage 102 and a second turbine rotor blade stage located axially aft of the second turbine nozzle stage 102. In such embodiments, the shroud may extend axially from a forward end positioned generally near leading edges 170 of nozzles 108 of the second turbine nozzle stage 102 to an aft end positioned generally near trailing edges of blades of the second turbine rotor blade stage. Of course, in appropriate embodiments, the shroud 128 may be elongated to form an outer wall of more than two stages of the turbine or compressor sections. Further, it will be understood that in embodiments in which shroud 128 is configured to extend through stages other than the first turbine rotor blade stage 122 and second turbine nozzle stage 102 as described above, the shroud 128 may be otherwise configured as described above. That is, the shroud 128 may define openings 144, rails 178, pin mounts 184, and the like, although the relative positions of such features may be different based on which stages to which the shroud is adjacent. As one example, openings 144 would be defined in the forward end of shroud 128, rather than the aft end, in embodiments in which shroud 128 extends from a nozzle stage through a blade stage.

Accordingly, a method of assembling turbofan engine 10 may include positioning one of a rotor blade stage and a nozzle stage immediately upstream of the other of the rotor blade stage or nozzle stage such that one stage is an upstream stage and the other stage is a downstream stage. The method also may include positioning a shroud 128 to form an outer wall of both the rotor blade stage and the nozzle stage of the engine. When positioned to form the outer wall of both stages, the shroud extends axially from near the leading edges of the airfoils of the upstream stage to near the trailing edges of the airfoils of the downstream stage. Further, the method may include attaching the shroud 128 to a casing of the engine, such as casing 18 of turbofan engine 10; providing seals between a plurality of nozzles and the shroud 128 and/or between a plurality of nozzles and an inner band of the nozzle stage; and/or providing one or more stops as previously described. As an example of such a method of assembly, a shroud 128 may be positioned to form an outer wall of both first turbine rotor blade stage 122 and second turbine nozzle stage 102 as described above, where first turbine rotor blade stage 122 is positioned immediately upstream of second turbine nozzle stage 102 such that blade stage 122 is an upstream stage and nozzle stage 102 is a downstream stage. In such embodiments, the shroud 128 extends axially from near the leading edges 125 of airfoils 123 of the upstream rotor blade stage 122 to near the trailing edges 172 of airfoils 160 of the downstream nozzle stage 102. The shroud 128 may be attached to casing 18 using rails 178, pin mounts 184, etc., and nozzle-shroud seals 188, nozzle-band seals 206, and/or stops 216a, 216c may be provided, e.g., to help stop leakage of combustion gases 66 from hot gas path 78, to help load nozzles 108 into casing 18, and/or to help maintain the relative positions of nozzles 108 and shroud 128. Of course, as described, shroud 128 may be formed from a plurality of shroud segments 150, such that the method comprises positioning the plurality of shroud segments 150 to form an outer wall of both a rotor blade stage and a nozzle stage.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

CMC materials may be used for various components of the engine, for example, turbine nozzles and/or airfoils in the compressor, and/or fan regions. With respect to the present subject matter, shroud segments 150 or nozzles 108, or both shroud segments 150 and nozzles 108, may be made from CMC materials. That is, in one embodiment, shroud segments 150 may be made from a CMC material, and nozzles 108 may be made from a metallic material. In another embodiment, shroud segments 150 and nozzles 108 may be made from a CMC material, and in some embodiments, shroud segments 150 and nozzles 108 may be integrally formed from a CMC material such that a shroud segment 150 and one or more nozzles 108 are a single, continuous CMC component. In still another embodiment, shroud segments 150 may be made from a metallic material, and nozzles 108 may be made from a CMC material. In yet another embodiment, shroud segments 150 and nozzles 108 may be made from a metallic material, and in appropriate embodiments, shroud segments 150 and nozzles 108 may be integrally formed from a metallic material. Other materials may be used as well. Further, it will be appreciated that, as previously stated, shroud 128 may be formed as a single piece component rather than from a plurality of shroud segments 150, and in such embodiments, shroud 128 may be formed from a metallic, CMC, or other appropriate material.

Of course, other components of turbofan 10, including other components of HP turbine section 28, may be made from CMC materials such that turbofan 10 may comprise components formed from any combination of materials. As a particular example, inner band segments 142 may be made from a CMC material, and as a further example, inner band segments 142 and nozzles 108 may be integrally formed from a CMC material such that an inner band segment 142 and one or more nozzles 108 are a single, continuous CMC component. However, inner band segments 142, or the inner band of second nozzle stage 102 if the inner band is formed as a single piece component rather than from a plurality of segments 142, also may be formed from a metallic or other material, and in appropriate embodiments, may be integrally formed with nozzles 108 from a metallic or other suitable material.

FIG. 9 provides a chart illustrating a method 900 for forming a shroud segment 150 from a CMC material to form a CMC shroud segment 150, according to an exemplary embodiment of the present subject matter. As shown at 902 in FIG. 9, a plurality of plies of a CMC material for forming the CMC shroud 150 may be laid up to define a desired shape. Preferably, the plies forming shroud segment 150 contain continuous CMC fibers along their lengths. Continuous fiber CMC plies can help avoid relying on the interlaminar capability of the material to resist stresses on the component.

During the layup, a desired component shape may be generally defined; the component shape may be finally defined after the plies are processed and machined as needed. The CMC plies may be laid up on a layup tool, mandrel, mold, or other appropriate device for supporting the plies and/or for defining the desired shape. In one embodiment, laying up the CMC plies may comprise layering a plurality of CMC plies defining the forward end 152 of shroud segment 150 with a plurality of CMC plies defining the aft end 154 of shroud segment 150. The plies may be layered by alternating plies such that the forward end plies are interspersed with the aft end plies. That is, laying up the plurality of CMC plies to form shroud segment 150 may include interspersing forward and aft end CMC plies. Interspersing the plies for forming various portions of shroud segment 150 integrates the various portions such that the resultant CMC component is an integral component.

In some embodiments, multiple layups or preforms may be laid up together to form a preform assembly. More particularly, the layup portion of method 900 depicted at 902 in FIG. 9 may include laying up multiple preforms, layups, and/or plies to form a shroud segment preform. For example, the layup preforming step may comprise layering multiple plies or structures, such as plies pre-impregnated with matrix material (prepreg plies), prepreg tapes, or the like, to form a desired shape of the resultant CMC component. The layers are stacked to form a layup or preform, which is a precursor to the CMC component, e.g., shroud segment 150.

After the CMC plies and/or other CMC structures are laid up to form the layup, the layup may be processed, e.g., compacted and cured in an autoclave, as shown at 904 in FIG. 9. After processing, the layup is a green state component, i.e., a green state shroud segment 150. The green state component is a single piece component, i.e., curing the plies 124 produces a unitary component formed from a continuous piece of CMC material.

Various methods, techniques, and/or processes may be used to form an opening 144, or at least a portion of an opening 144, in a shroud segment 150. For example, in some embodiments, at least a portion of an opening 144 may be defined by cutting each individual ply forming the aft end 154 of shroud segment 150 before the plies are laid up to form shroud segment 150. The plies may be cut, e.g., using a precision Gerber cutter by Gerber Technology of Tolland, Conn. In other embodiments, another type of cutter or other means may be used to form cut-outs in the plies to define the opening 144. Alternatively or additionally, the shroud segment may be processed in an autoclave, e.g., at a reduced temperature relative to a standard autoclave cycle such that the green state component retains some flexibility and malleability after autoclaving, which can assist in further manipulation of the component, such as defining opening 144. For example, at least a portion of an opening 144 may be machined in the green state shroud segment 150, and the malleability of the green state component may help in machining the opening. Opening 144, or at least a portion thereof, may be formed in the green state shroud segment 150 using one or more of laser drilling, electric discharge machining (EDM), precision machining, cutting, or other machining methods. In other embodiments, the CMC plies may be processed using a standard autoclave cycle and then the green state component may be machined as described to define at least a portion of opening 144. Of course, other apertures or openings in shroud segment 150, e.g., cooling passages or the like, may be defined by cutting the CMC plies that are laid up to define the component or by machining the green state component as described, or using any other suitable technique.

Next, the green state component may undergo firing (or burn-out) and densification, illustrated at 906 and 908 in FIG. 9, to produce a final unitary CMC shroud segment 150. In an exemplary embodiment of method 900, the green state component is placed in a furnace with silicon to burn off any mandrel-forming materials and/or solvents used in forming the CMC plies, to decompose binders in the solvents, and to convert a ceramic matrix precursor of the plies into the ceramic material of the matrix of the CMC shroud segment 150. The silicon melts and infiltrates any porosity created with the matrix as a result of the decomposition of the binder during burn-off/firing. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or other appropriate material or materials to melt-infiltrate into the CMC component.

After firing and densification, as shown at 910 in FIG. 4, the CMC shroud segment 150 may be finished. For example, the component may be finish machined, if and as needed, to finish the component. Additionally or alternatively, an environmental barrier coating (EBC) may be applied to CMC shroud segment 150 to finish the component. It will be appreciated that the CMC shroud segment 150 produced using the foregoing method 900 comprises the features of shroud segment 150 previously described, e.g., forward and aft ends 152, 154, with at least a portion of an opening 144 defined in the aft end 154.

Method 900 is provided by way of example only. For example, other processing cycles, e.g., utilizing other known methods or techniques for compacting and/or curing CMC plies, may be used. Further, CMC shroud segment 150 may be post-processed or densified using a melt-infiltration process or a chemical vapor infiltration process, or CMC shroud segment 150 may be a matrix of pre-ceramic polymer fired to obtain a ceramic matrix. Alternatively, any combinations of these or other known processes may be used.

Of course, as described above, other components of turbofan 10, such as second stage turbine nozzles 108, may be fabricated using CMC materials. In an exemplary embodiment, nozzles 108 may be CMC nozzles 108 formed using a method similar to method 900. For example, a plurality of CMC plies may be laid up, with the layup of plies defining a desired shape of nozzle 108. Then, the nozzle 108 may be processed, e.g., compacted and cured in an autoclave, to form a green state CMC nozzle 108. In some embodiments, the green state nozzle 108 may be machined, e.g., using a laser, precision, EDM, or other suitable machining process, to define various features of nozzle 108. As an example, for a nozzle 108 incorporating a pocket 202 defined in the flange portion 198 of outer nozzle end 168, the pocket 202 may be machined in the green state nozzle 108. After processing and any green state machining, the nozzle 108 may be fired and densified to form a final, unitary CMC nozzle 108. For example, the CMC nozzle 108 may be fired in a furnace and densified using a melt-infiltration process whereby the fired CMC nozzle 108 is melt-infiltrated with, e.g., silicon. After firing and densification, CMC nozzle 108 also may be finish machined and/or coated with, e.g., an EBC, as desired. Other processes, e.g., a CVI or PIP densification rather than MI densification, may be used as well to form a CMC nozzle 108.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A gas turbine engine, comprising:
a rotor blade stage, the rotor blade stage including a plurality of circumferentially spaced rotor blades, each rotor blade having a tip;
a nozzle stage adjacent the rotor blade stage, the nozzle stage including a plurality of circumferentially spaced nozzles, each nozzle extending radially outward from an inner band; and
a shroud having:
a forward end positioned radially outward from each tip of the circumferentially spaced rotor blades;
an aft end positioned radially outward from the inner band of the nozzle stage, an outer nozzle end of each nozzle of the plurality of circumferentially spaced nozzles extending through the aft end such that the outer nozzle end of each nozzle extends radially outward beyond an outer surface of the shroud; and
a plurality of retainers, with an entirety of each retainer disposed radially outward from a portion of the outer nozzle end of a respective one nozzle of the plurality of circumferentially spaced nozzles that the retainer overlays;
wherein the shroud extends axially from the forward end to the aft end, the forward end positioned forward of a leading edge of each of the plurality of circumferentially spaced rotor blades and the aft end positioned aft of a trailing edge of each nozzle of the plurality of circumferentially spaced nozzles.

2. The gas turbine engine of claim 1, wherein at least one retainer of the plurality of retainers extends circumferentially between a first retainer mount and a second retainer mount.

3. The gas turbine engine of claim 2, wherein the shroud comprises a plurality of shroud segments, wherein each shroud segment defines a first side extending axially from the forward end to the aft end and a second side extending axially from the forward end to the aft end, wherein the second side is circumferentially opposite the first side, wherein the first retainer mount is disposed adjacent the first side and the second retainer mount is disposed adjacent the second side.

4. The gas turbine engine of claim 1, further comprising:
a plurality of nozzle-shroud seals, each nozzle-shroud seal extending along an interface between the shroud and a respective one nozzle of the plurality of circumferentially spaced nozzles,
wherein each retainer of the plurality of retainers seats the nozzle-shroud seal between the shroud and the respective one nozzle of the plurality of circumferentially spaced nozzles.

5. The gas turbine engine of claim 4, wherein the outer nozzle end of each nozzle defines a flange extending about the outer nozzle end, the flange having a contact surface extending adjacent the outer surface of the shroud.

6. The gas turbine engine of claim 5, wherein each nozzle-shroud seal is positioned between the outer surface of the shroud and the contact surface of the respective one nozzle of the plurality of circumferentially spaced nozzles.

7. The gas turbine engine of claim 5, wherein the flange of each nozzle defines a flange pocket adjacent the contact surface, and wherein each nozzle-shroud seal is disposed in the flange pocket of the respective one nozzle of the plurality of circumferentially spaced nozzles.

8. The gas turbine engine of claim 4, wherein the shroud defines a plurality of openings in the aft end, wherein the outer nozzle end of each nozzle extends through a respective one opening of the plurality of openings, wherein the shroud defines a shroud pocket adjacent each opening, and wherein a respective one nozzle-shroud seal of the plurality of nozzle-shroud seals is disposed in the shroud pocket.

9. The gas turbine engine of claim 8, wherein each nozzle includes an airfoil extending between an inner nozzle end and the outer nozzle end, and wherein the respective one nozzle-shroud seal disposed in the shroud pocket adjacent each opening is positioned between the shroud and the airfoil of the respective one nozzle of the plurality of circumferentially spaced nozzles.

10. The gas turbine engine of claim 4, wherein each nozzle-shroud seal has a rectangular cross-section.

11. The gas turbine engine of claim 4, wherein each nozzle-shroud seal has a circular cross-section.

12. The gas turbine engine of claim 4, further comprising:
a plurality of nozzle-band seals, each nozzle-band seal extending along an interface between the inner band and a respective one nozzle of the plurality of circumferentially spaced nozzles.

13. A shroud segment for a gas turbine engine, the gas turbine engine including a rotor blade stage and a nozzle stage, the nozzle stage including a plurality of circumferentially spaced nozzles, with each nozzle including an outer nozzle end and an airfoil extending from the outer nozzle end, the shroud segment comprising:
a forward end, the forward end defining an outer wall of the rotor blade stage;
an aft end, the aft end defining an outer wall of the nozzle stage, the aft end defining at least a portion of an opening therethrough for receipt of a nozzle; and
a pocket defined in the aft end adjacent the opening, the pocket axially extending into a portion of the aft end and confronting at least a portion of the airfoil,
wherein the forward end and the aft end forms a single, continuous component; and
wherein the plurality of circumferentially spaced nozzles each extend through the opening such that the outer nozzle end of each nozzle extends radially outward beyond an outer surface of the shroud segment.

14. The shroud segment of claim 13, wherein the pocket is configured for receipt of a nozzle-shroud seal.

15. The shroud segment of claim 13, further comprising:
a mounting rail extending circumferentially across the forward end;
a pin mount extending circumferentially across the aft end;
a first retainer mount defined between the mounting rail and the pin mount, the first retainer mount extending axially across the aft end; and
a second retainer mount defined between the mounting rail and the pin mount, the second retainer mount extending axially across the aft end, the second retainer mount circumferentially spaced apart from the first retainer mount,
wherein each of the mounting rail and the pin mount define a pin aperture therein, each pin aperture configured for receipt of a mounting pin to mount the shroud segment within the gas turbine engine, and
wherein each of the first retainer mount and the second retainer mount define a retainer aperture therein, each retainer aperture configured for receipt of an end of a retainer to retain the nozzle.

16. A method of assembling a gas turbine engine, the gas turbine engine including a rotor blade stage and a nozzle stage, the method comprising:

positioning a shroud to form an outer wall of both the rotor blade stage and the nozzle stage;

inserting a nozzle through an opening defined in the shroud, the nozzle including an airfoil having opposite pressure and suction sides extending radially from an inner nozzle end to an outer nozzle end and extending axially from a leading edge to a trailing edge; and positioning a retainer radially outward from the outer nozzle end of the nozzle such that an entirety of the retainer is provided radially outward from a portion of the outer nozzle end the retainer overlays the retainer extending circumferentially across the outer nozzle end.

17. The method of claim 16, further comprising:

positioning a nozzle-shroud seal between the shroud and the outer nozzle end of the nozzle.

18. The method of claim 17, wherein positioning the nozzle-shroud seal comprises positioning the nozzle-shroud seal within a pocket defined in the outer nozzle end.

19. The method of claim 16, further comprising:

positioning a nozzle-band seal between the shroud and the inner nozzle end of the nozzle, wherein the nozzle-band seal is positioned within a depression defined in an inner band of the nozzle stage, the inner band radially opposite the shroud, and wherein the depression is configured for receipt of the inner nozzle end.

20. The method of claim 19, wherein the nozzle-band seal extends along an interface between the nozzle and the inner band.

* * * * *